(12) United States Patent
Scarpinato et al.

(10) Patent No.: US 9,518,579 B2
(45) Date of Patent: Dec. 13, 2016

(54) OIL FLOODED COMPRESSOR HAVING MOTOR OPERATED TEMPERATURE CONTROLLED MIXING VALVE

(75) Inventors: Paul A. Scarpinato, Clemmons, NC (US); Sudhir Sreedharan, Chennai (IN); James D. Mehaffey, Mooresville, NC (US); Paul A. Kirkpatrick, Mount Holly, NC (US)

(73) Assignee: INGERSOLL-RAND COMPANY, Davidson, NC (US)

( * ) Notice: Subject to any disclaimer, the term of this patent is extended or adjusted under 35 U.S.C. 154(b) by 876 days.

(21) Appl. No.: 13/580,291

(22) PCT Filed: Oct. 28, 2010

(86) PCT No.: PCT/US2010/054495
§ 371 (c)(1),
(2), (4) Date: Nov. 19, 2012

(87) PCT Pub. No.: WO2011/090528
PCT Pub. Date: Jul. 28, 2011

(65) Prior Publication Data
US 2013/0058799 A1    Mar. 7, 2013
US 2016/0138594 A9    May 19, 2016

Related U.S. Application Data

(63) Continuation-in-part of application No. PCT/US2010/021732, filed on Jan. 22, 2010.

(51) Int. Cl.
*F04B 49/22* (2006.01)
*F04B 53/08* (2006.01)
(Continued)

(52) U.S. Cl.
CPC .............. *F04B 49/22* (2013.01); *F01M 5/007* (2013.01); *F04B 49/06* (2013.01); *F04B 53/08* (2013.01);
(Continued)

(58) Field of Classification Search
CPC ........... F04B 49/06; F04B 53/18; F04B 39/02; F04B 49/22; F04B 53/08; F04B 39/0207; F04C 15/0088; F04C 15/0092; F04C 29/021; F16K 11/0716; F16K 19/00; F01P 7/16; F16H 57/0413; F01M 5/007; F01M 5/005; G05F 23/1931; G05F 23/023; G05F 23/1858; Y10T 137/7737
(Continued)

(56) References Cited

U.S. PATENT DOCUMENTS 2,480,676 A    8/1949    Shaw
2,540,629 A    2/1951    Miller
(Continued)

FOREIGN PATENT DOCUMENTS

CN    1164624    11/1997
CN    2555491    6/2003
(Continued)

OTHER PUBLICATIONS

International Search Report dated Jun. 245, 2011 of PCT/US2010/054495, filed Oct. 28, 2010.
(Continued)

*Primary Examiner* — Bryan Lettman
*Assistant Examiner* — Timothy P Solak
(74) *Attorney, Agent, or Firm* — Taft Stettinius & Hollister LLP

(57) ABSTRACT

A thermal control valve for use in a lubricant flooded compressor system including a controller that generates a
(Continued)

control signal includes a valve body including a hot coolant inlet, a cooled coolant inlet, a mixed coolant outlet, an actuator space, and a cylinder bore. A sleeve is positioned within the cylinder bore and is movable between a first position, a second position, and a third position, and an electrical actuator is at least partially disposed within the actuator space and is operable in response to the control signal to move the sleeve between the first position, the second position, and the third position.

20 Claims, 8 Drawing Sheets

(51) Int. Cl.
| | |
|---|---|
| *F16K 11/07* | (2006.01) |
| *F01M 5/00* | (2006.01) |
| *F04B 49/06* | (2006.01) |
| *F04B 53/18* | (2006.01) |
| *G05D 23/02* | (2006.01) |
| *G05D 23/19* | (2006.01) |
| *F04C 29/00* | (2006.01) |
| *F04C 29/02* | (2006.01) |
| *F04C 29/04* | (2006.01) |

(52) U.S. Cl.
CPC ........... *F04B 53/18* (2013.01); *F04C 29/0007* (2013.01); *F04C 29/021* (2013.01); *F04C 29/04* (2013.01); *F16K 11/0716* (2013.01); *G05D 23/023* (2013.01); *G05D 23/1931* (2013.01); *Y10T 137/7737* (2015.04)

(58) Field of Classification Search
USPC ..... 417/228, 438; 236/12.1, 12.11; 184/6.16
See application file for complete search history.

(56) References Cited

U.S. PATENT DOCUMENTS

| | | | | |
|---|---|---|---|---|
| 2,975,973 | A | | 3/1961 | Carroll |
| 2,988,280 | A | | 6/1961 | Kimm et al. |
| 3,721,386 | A | * | 3/1973 | Brick ................... G05D 21/02 137/625.41 |
| 3,865,514 | A | * | 2/1975 | Lonnemo ................ F04B 49/22 417/212 |
| 4,019,678 | A | * | 4/1977 | Lord .................... G05D 23/138 236/12.11 |
| 4,024,909 | A | | 5/1977 | Hofmann, Jr. |
| 4,190,198 | A | | 2/1980 | Casuga et al. |
| 4,195,774 | A | | 4/1980 | Warner |
| 4,398,662 | A | | 8/1983 | Costello |
| 4,431,390 | A | * | 2/1984 | Hart ..................... F04C 29/021 418/84 |
| 4,488,680 | A | | 12/1984 | Itoh |
| 4,537,346 | A | | 8/1985 | Duprez |
| 5,052,424 | A | * | 10/1991 | Zerndt ................. F16K 31/043 137/1 |
| 5,094,426 | A | * | 3/1992 | Zajac .................. F16K 31/1221 251/129.05 |
| 5,318,151 | A | * | 6/1994 | Hood .................... F04C 29/021 184/104.1 |
| 5,791,557 | A | | 8/1998 | Kunze |
| 5,803,354 | A | * | 9/1998 | Benedict ...................... 236/12.2 |
| 5,890,515 | A | | 4/1999 | Spiess et al. |
| 5,984,195 | A | | 11/1999 | Benedict |
| 5,988,514 | A | | 11/1999 | Huang |
| 6,405,932 | B1 | | 6/2002 | Palmer |
| 6,457,652 | B1 | | 10/2002 | Fukamachi et al. |
| 6,575,707 | B2 | | 6/2003 | Matt et al. |
| 6,719,546 | B2 | | 4/2004 | Foerster |
| 6,863,221 | B2 | | 3/2005 | Colas et al. |
| 6,915,958 | B2 | | 7/2005 | Colas et al. |
| 7,114,913 | B2 | | 10/2006 | Coker et al. |
| 7,299,994 | B2 | | 11/2007 | Brown et al. |
| 7,490,662 | B2 | | 2/2009 | Eliades et al. |
| 2003/0086793 | A1 | * | 5/2003 | Matt et al. .................... 417/228 |
| 2009/0120114 | A1 | | 5/2009 | Scarpinato |

FOREIGN PATENT DOCUMENTS

| | | | |
|---|---|---|---|
| CN | 1761829 | | 4/2006 |
| CN | 101435426 | A | 5/2009 |
| DE | 1149368 | | 5/1963 |
| EP | 1887266 | | 2/2008 |
| EP | 2058522 | | 6/2012 |
| GB | 2111662 | A | 7/1983 |
| JP | 2000346215 | A | 12/2000 |
| WO | 02070930 | | 9/2002 |
| WO | 03/048575 | A1 | 6/2003 |
| WO | WO2011090482 | * | 7/2011 .............. F04B 39/02 |

OTHER PUBLICATIONS

International Search Report in corresponding PCT application (i.e., PCT/US2010/021732), mailed Apr. 25, 2012 (7 pages).
Written Opinion in corresponding PCT Application (i.e., PCT/US2010/021732), mailed Apr. 25, 2012 (11 pages).
International Search Report for PCT Application No. PCT/US2010/054495, mailed Jun. 24, 2011 (3 pages).
Written Opinion for PCT Application No. PCT/US2010/054495, mailed Jun. 24, 2011 (4 pages).
CN First Office Action in corresponding CN patent application for Invention No. 201080065661.2 (PCT/US2010/054495), mailed Jul. 22, 2014 (pages).
English Language Translation CN First Office Action in corresponding CN patent application for Invention No. 201080065661.2 (PCT/US2010/054495), mailed Jul. 22, 2014 (20 pages).
Supplementary European Search Report, EP10844145.2, Oct. 5, 2015.

* cited by examiner

OIL FLOODED COMPRESSOR HAVING MOTOR OPERATED TEMPERATURE CONTROLLED MIXING VALVE

CROSS REFERENCE TO RELATED APPLICATIONS

This application is a section 371 national stage filing of international application PCT/US2010/054495, filed Oct. 28, 2010, which is a continuation in part of PCT Application No. PCT/US2010/021732, filed Jan. 22, 2010, each of which is incorporated herein by reference.

BACKGROUND

The present invention relates to compressors. More particularly, the present invention relates to a mechanism for managing the flow and temperature of lubricant/coolant in a compressor system.

A compressor system including, for example a contact-cooled rotary screw airend, injects a lubricating coolant (referred to herein as lubricant, coolant, oil, etc.) such as oil into the compression chamber to absorb the heat created by the compression of air and lubrication. The temperature of the oil must be maintained within a range to maximize its life and to minimize the formation of condensation within the compressor system. The amount and temperature of the injected oil also has an effect on the overall performance of the airend.

SUMMARY

In one construction, the invention provides a compressor system including a compressor including a gas inlet and a lubricant inlet, the compressor operable to compress a gas and discharge a mixed flow of compressed gas and lubricant. A valve housing includes a hot lubricant inlet, a cooled lubricant inlet, and a lubricant outlet connected to the lubricant inlet of the compressor and a sleeve is disposed within the valve housing and is movable between a first position and a second position. The sleeve selectively uncovers the hot lubricant inlet to selectively direct a hot lubricant to the lubricant outlet and selectively uncovers the cooled lubricant inlet to selectively direct a cooled lubricant to the lubricant outlet. The hot lubricant and cooled lubricant mixes at the lubricant outlet to define a bulk lubricant that is directed to the lubricant inlet of the compressor. A controller is operable to sense a parameter and generate a control signal at least partially in response to the sensed parameter and a motor is coupled to the sleeve and is operable to move the sleeve in response to the control signal. The movement of the sleeve is operable to vary the amount of hot lubricant admitted through the first aperture and to vary the amount of cooled lubricant admitted through the second aperture to control a temperature of the bulk lubricant.

In another construction, the invention provides a thermal control valve for use in a lubricant flooded compressor system including a controller that generates a control signal. The thermal control valve includes a valve body including a hot coolant inlet, a cooled coolant inlet, a mixed coolant outlet, an actuator space, and a cylinder bore. A sleeve is positioned within the cylinder bore and is movable between a first position, a second position, and a third position, and an electrical actuator is at least partially disposed within the actuator space and is operable in response to the control signal to move the sleeve between the first position, the second position, and the third position.

In yet another construction, the invention provides a method of controlling the temperature and quantity of a bulk flow of coolant to a lubricant flooded compressor in a compressor system. The method includes dividing a flow of hot coolant into a first flow of coolant and a second flow of coolant, cooling the first flow of coolant to produce a third flow of coolant, and directing the second flow of coolant and the third flow of coolant to a valve and discharging the bulk flow of coolant from the valve. The method also includes sensing a parameter of the compressor system and delivering the measured parameter to a controller, generating a control signal at least partially in response to the sensed parameter, and operating an electrical actuator at least partially in response to the control signal to configure the valve between a first position, a second position, and a third position. The bulk flow of coolant includes only coolant from the second flow of coolant when the valve is in the first position, the bulk flow of coolant includes only coolant from the third flow of coolant when the valve is in the second position, and the bulk flow of coolant includes a mixture of coolant from the second flow of coolant and the third flow of coolant when the valve is between the first position and the second position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
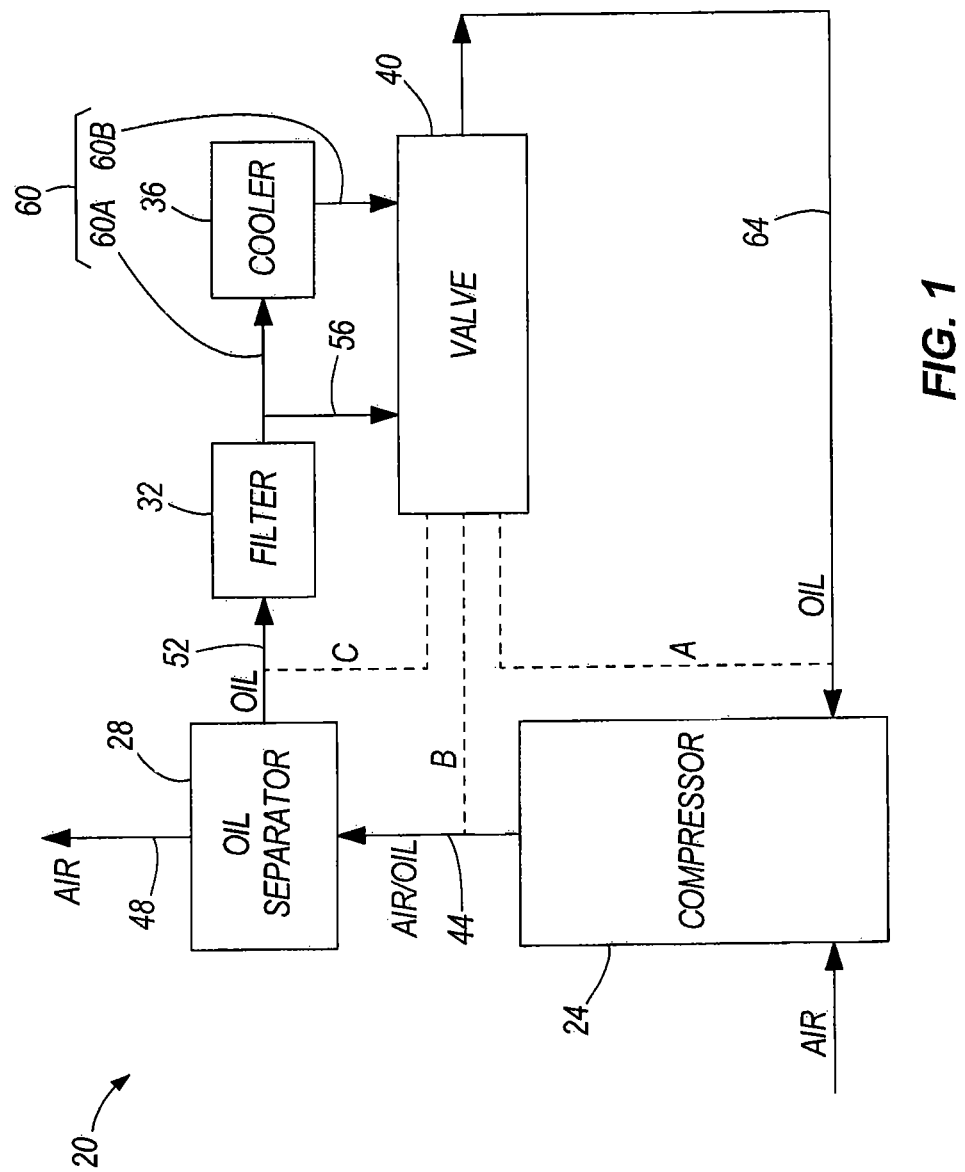
FIG. 1 is a schematic illustration of a compressor system including a flow and temperature control device.

FIG. 1 illustrates a compressor system 20 including a compressor airend (referred to herein simply as the compressor 24, an oil separator 28, a filter 32, an oil cooler 36, and a control valve 40. The compressor 24 compresses air and oil to produce an air/oil mixture having an elevated pressure compared to the air and oil supplied to the compressor 24. Although referred to throughout as "air" and "oil", the specific type of gas being compressed and the specific type of lubricating coolant injected for compression with the gas is not critical to the invention, and may vary based on the type of compressor, the intended usage, or other factors.

The air and oil compressed within the compressor 24 undergoes an increase in pressure and also temperature. The air/oil mixture is directed from the compressor 24 to the oil separator 28 along an air/oil or "compressor outlet" flow path 44 as shown in FIG. 1. The oil separator 28 separates the air/oil mixture into two separate flows, a flow of compressed air that exits the oil separator 28 along a first outlet flow path 48, and a flow of oil that exits the oil separator 28 along a second outlet flow path 52. The compressed air in the first outlet flow path 48 can be supplied to any point-of-use device or to additional processing components or assemblies (not shown) of the compressor system 20, such as a cooler, dryer, additional compressor(s), etc. The flow of oil in the second outlet flow path 52 from the oil separator 28 is directed to the filter 32, which filters the oil of contaminants before it is returned to the compressor 24.

From the filter 32, the oil can be directed along one of two separate flow paths to the control valve 40. The first flow path 56 directs oil directly from the filter 32 to the control valve 40 without cooling the oil. The second flow path 60 between the filter 32 and the control valve 40 directs oil through the oil cooler 36 that is positioned along the second flow path 60. A first portion 60A of the second flow path 60 is an oil cooler inlet flow path, and a second portion 60B of the second flow 60 is an oil cooler outlet flow path.

Figure 2:
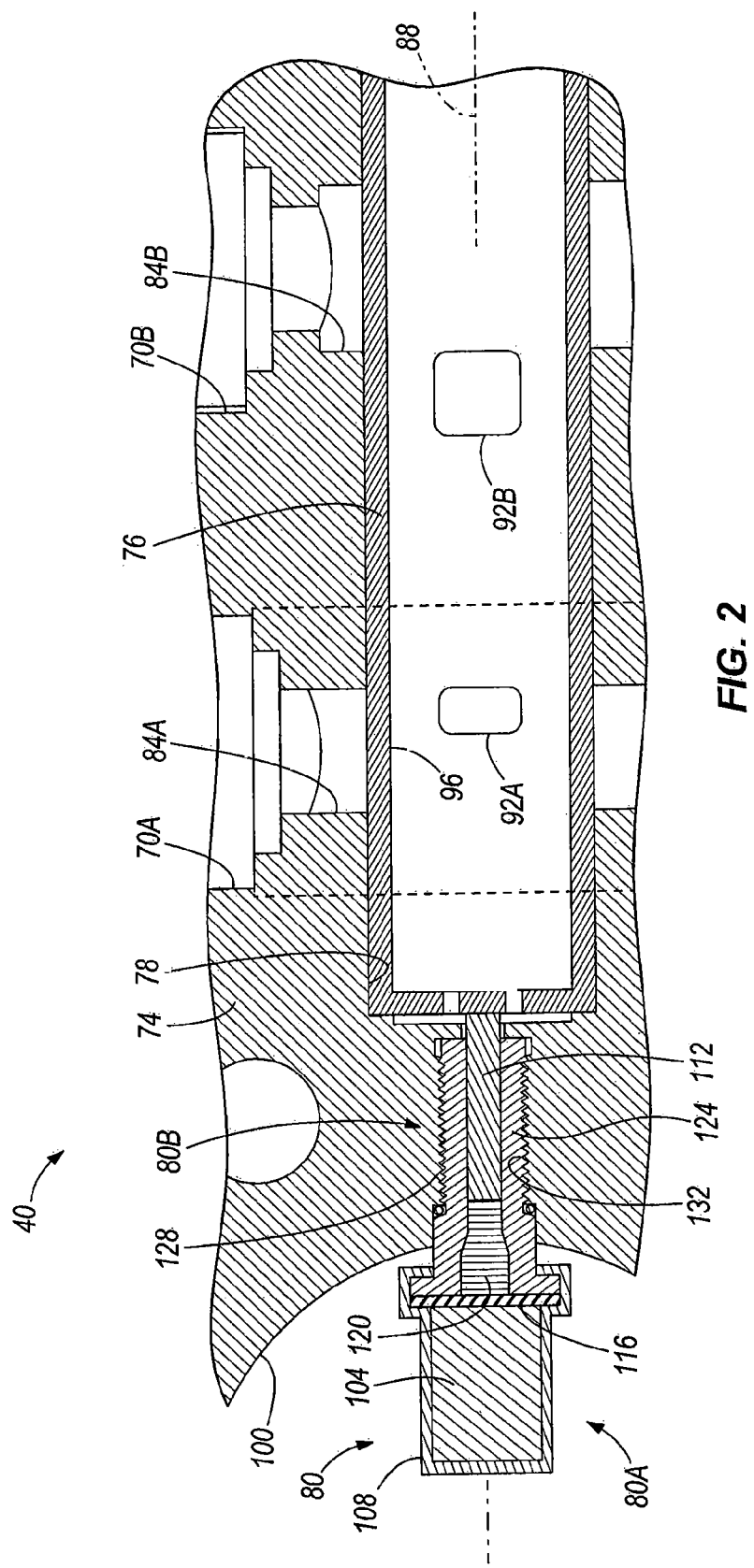
FIG. 2 is a section view of the flow and temperature control device of FIG. 1, in which a sleeve of the device is in a first position.

Both of the flow paths 56, 60 from the filter 32 lead to the control valve 40, which has a single outlet leading to an oil supply flow path 64 which supplies the oil back to the compressor 24. By selective restriction of the flow through the valve 40 from each of the flow paths 56, 60 to the valve outlet (i.e., the oil supply flow path 64), the valve 40 controls how much of the oil flowing through the filter 32 is directed through the cooler 36 and how much is passed directly from the filter 32 to the valve 40. The first outlet flow path 56 from the filter 32 is an inlet flow path to a first inlet 70A of the valve 40 (FIG. 2). The second outlet flow path 60 from the filter 32 is an inlet flow path to a second inlet 70B of the valve 40 (FIG. 2).

Figure 3:
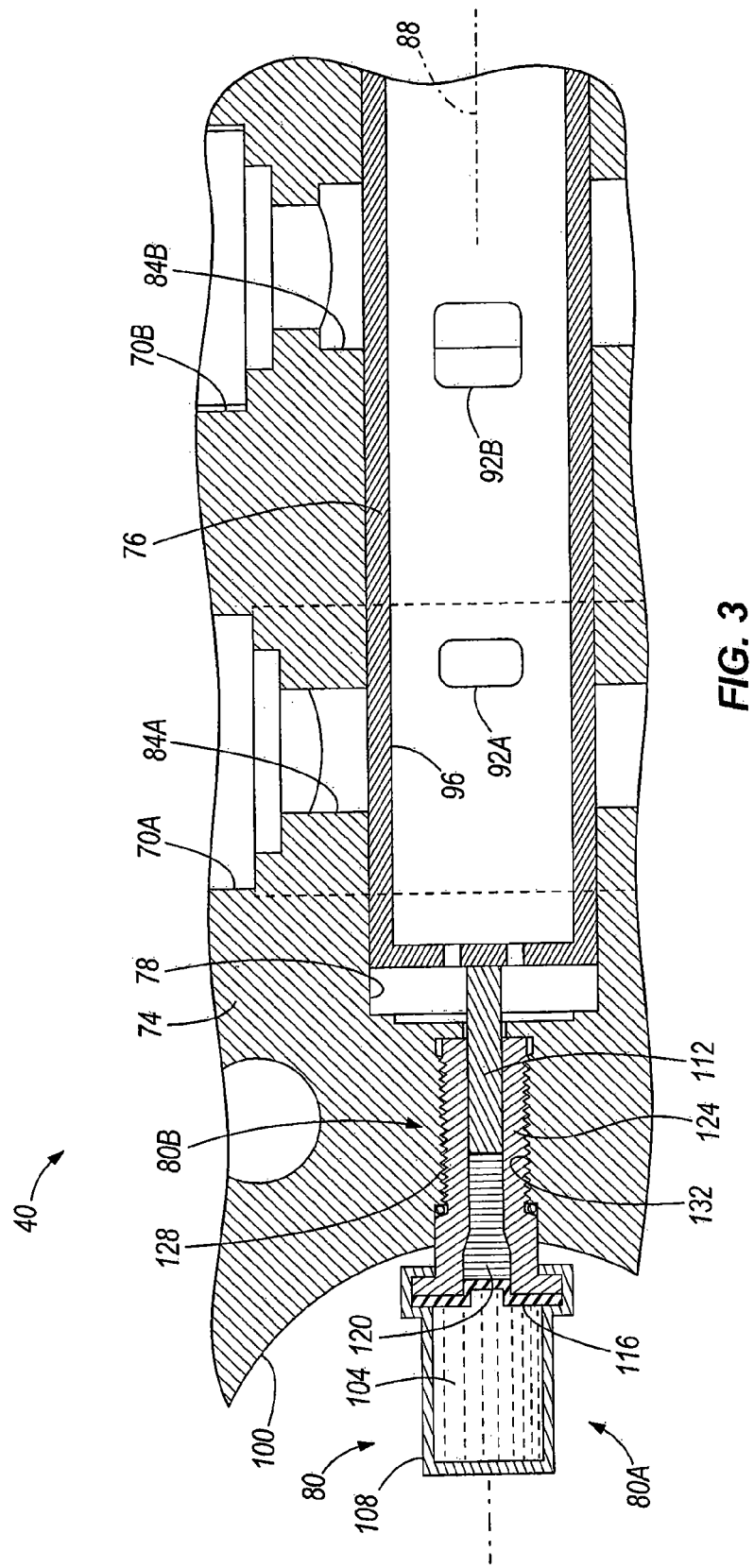
FIG. 3 is a section view of the flow and temperature control device of FIG. 1, in which the sleeve is in a second position.
Figure 4:
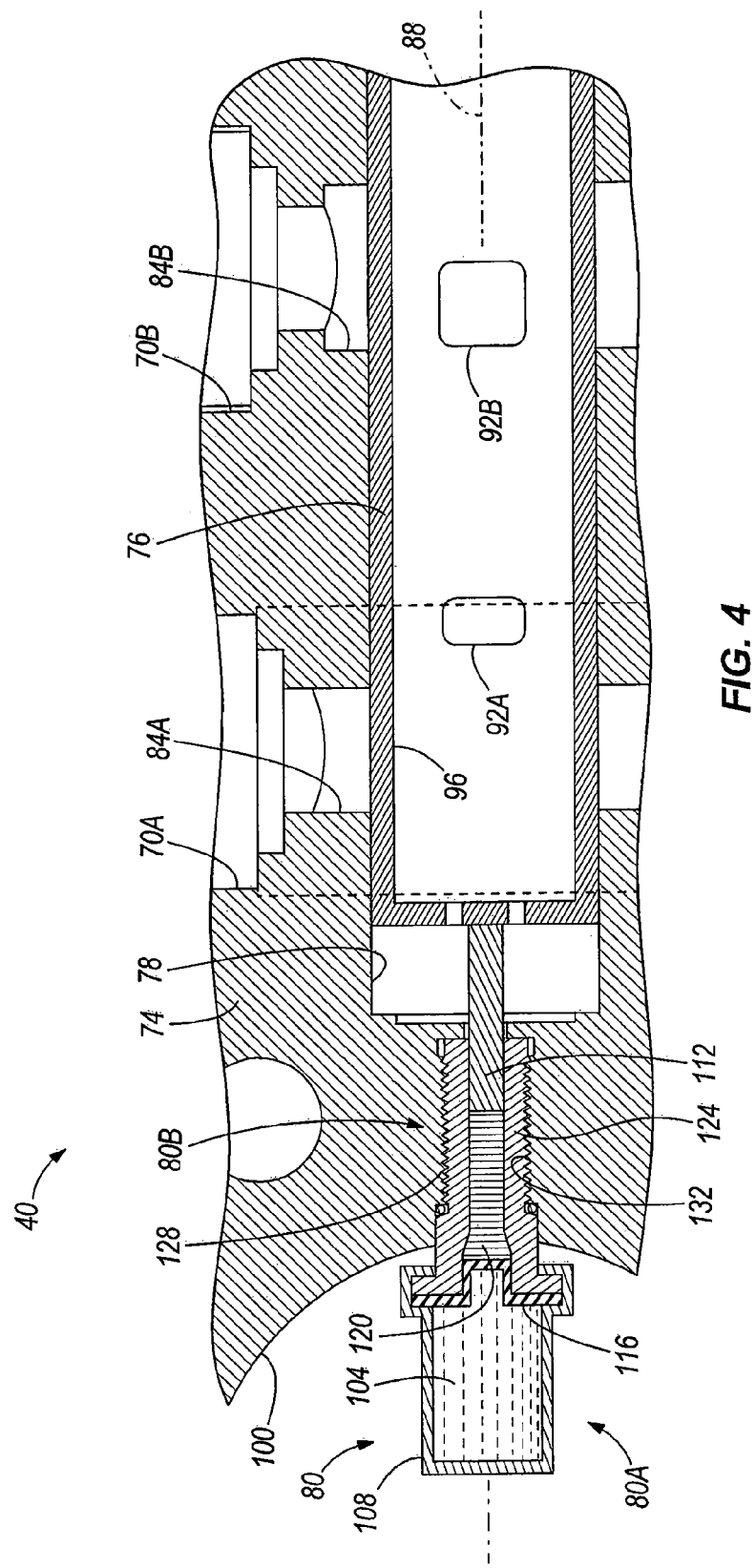
FIG. 4 is a section view of the flow and temperature control device of FIG. 1, in which the sleeve is in a third position.

As illustrated by FIGS. 2-4, the control valve 40 includes a body 74, a sleeve 76 movable within a chamber 78 formed in the body 74, and a thermal element or actuator 80 positioned at an end of the sleeve 76. The first inlet 70A of the valve 40 is in communication with a first annular passage 84A that surrounds the sleeve 76. The second inlet 70B of the valve 40 is in communication with a second annular passage 84B that surrounds the sleeve 76. The first and second annular passages 84A, 84B are spaced from each other along an axis 88 of the valve 40 defined by the chamber 78 and the sleeve 76. The sleeve 76 includes a first aperture 92A in selective communication with the first annular passage 84A and a second aperture 92B in selective communication with the second annular passage 84B. The second aperture 92B is larger than the first aperture 92A. Both of the apertures 92A, 92B are in communication with a mixing chamber 96 defined by the inside of the sleeve 76, which is substantially hollow and cylindrical in the illustrated construction. The mixing chamber 96 is in communication with the valve outlet (and thus, the oil supply flow path 64) so that all of the oil supplied to the mixing chamber 96 (whether from the first inlet 70A or the second inlet 70B, or both) is directed to the oil supply flow path 64. The oil transferred from the mixing chamber 96 to the oil supply flow path 64 through the valve outlet is referred to as the "bulk" flow of oil (or "combined" flow if oil that is received from both inlets 70A, 70B).

Although the first aperture 92A is illustrated as the only aperture for admitting oil into the mixing chamber 96 from the first inlet 70A and the second aperture 92B is illustrated as the only aperture for admitting oil into the mixing chamber 96 from the second inlet 70B, either one or both of the first and second apertures 92A, 92B can be one of a plurality of apertures spaced around the sleeve 76 to admit oil into the mixing chamber 96 from multiple angles about the respective annular passages 84A, 84B. Regardless of whether the first and second apertures 92A, 92B are the only two apertures or are each a part of a respective plurality of apertures, the functional characteristics described below are equally applicable.

Under most conditions of operation, the flow of oil to the compressor 24 should not exceed a predetermined desired flow rate for maximum performance of the compressor 24. Whenever the compressor 24 is operating at a temperature below a first predetermined set point, the sleeve 76 is in a first position as shown in FIG. 2. In the first position, the first aperture 92A is fully exposed to the first annular passage 84A and the second aperture 92B is fully blocked from communication with the second annular passage 84B. Thus, none of the flow of oil from the filter 32 is supplied to the valve 40 through the oil cooler 36. Rather, all of the flow of oil from the filter 32 to the valve 40 is provided through the first flow path 56, which is a flow path between the filter 32 and the valve 40 along which the oil is not actively cooled. The flow path may be a direct flow path between the filter 32 and the valve 40 as shown in FIG. 1. The first aperture 92A in the sleeve 76 is sized to provide a minimum required flow of oil when the sleeve 76 is in the first position. If the first aperture 92A is one of a plurality of apertures in communication with the first annular passage 84A, the plurality of apertures as a whole are sized to provide a minimum required flow of oil when the sleeve 76 is in the first position.

When the compressor 24 is operating at a temperature from the first predetermined set point up to a second predetermined set point, the sleeve 76 is gradually moved by the actuator 80 from the first position toward a second position (FIG. 3) as described in further detail below. In the second position, the second aperture 92B is partially exposed to the second annular passage 84B and the first aperture 92A is fully blocked from communication with the first annular passage 84A. Thus, none of the flow of oil from the filter 32 is supplied to the valve 40 directly through the first flow path 56. Rather, all of the flow of oil from the filter 32 to the valve 40 is provided through the second flow path 60, which directs the flow of oil through the oil cooler 36 before delivering it to the valve 40. When the sleeve 76 is in the second position, the exposed portion of the second aperture 92B in the sleeve 76 provides a flow of cooled oil about equal to the minimum required flow (i.e., about equal to the flow of oil provided through the first aperture 92A when the sleeve 76 is in the first position). During the transition between the first position and the second position, portions of both apertures 92A, 92B are exposed to the respective annular passages 84A, 84B so that a mix of "hot" oil (i.e., un-cooled by the oil cooler 36) and cooled oil is provided to the oil supply flow path 64. The remaining portions of both apertures 92A, 92B are blocked. At all times during the transition between the first position and the second position of the sleeve 76, the overall flow (i.e., "combined flow" or "bulk flow") of oil remains the same (i.e., about equal to the minimum required flow provided by the first aperture 92A in the first position) as the combined size of the portions of the apertures 92A, 92B that are exposed is about equal to the size of the first aperture 92A.

When the compressor 24 operates at a temperature above the second set point, the first aperture 92A remains closed and an increasingly greater portion of the second aperture 92B is gradually exposed to the second annular passage 84B, and thus the second inlet 70B. Thus, only cooled oil is provided to the oil supply flow path 64, similar to the sleeve 76 in the second position (FIG. 3). However, as the sleeve 76 moves from the second position (FIG. 3) toward a third position (FIG. 4), the overall flow of oil gradually increases, in excess of the minimum flow to provide additional cooling. The second aperture 92B in the sleeve 76 is sized to provide a maximum flow of cooled oil when fully open (i.e., fully exposed to the second annular passage 84B and the second inlet 70B when the sleeve 76 is in the third position). If the second aperture 92B is one of a plurality of apertures in communication with the second annular passage 84B, the plurality of apertures as a whole are sized to provide a maximum flow of cooled oil when fully open.

The actuator 80 includes a sensor portion 80A and a prime mover portion 80B. The sensor portion 80A is positioned in a chamber 100 of the valve body 74 that is remote from the chamber 78 that houses the sleeve 76. The chamber 100, and thus the sensor portion 80A of the actuator 80, is in fluid communication with the oil or the air/oil mixture. FIG. 1 illustrates three possible paths A, B, C for fluidly coupling the chamber 100 with oil or the air/oil mixture. Each of the paths A, B, C represents a potential tubing or piping conduit for fluidly coupling the chamber 100 and the sensor portion 80A with a fluid of the compressor system 20. The first path A couples the chamber 100 to the oil supply flow path 64 at a position just upstream of the compressor 24. Thus, the sensor portion 80A of the actuator 80 senses and reacts to the temperature of the oil just prior to injection into the compressor 24. The second path B couples the chamber 100 to the air/oil mixture just downstream of the compressor 24. Thus, the sensor portion 80A of the actuator 80 senses and reacts to the temperature of the air/oil mixture just after ejection from the compressor 24. The third path C couples the chamber 100 to the oil just downstream of the oil separator 28. Thus, the sensor portion 80A of the actuator 80 senses and reacts to the temperature of the oil just after separation from the compressed air/oil mixture.

In some constructions where the sensor portion 80A of the actuator 80 is fluidly coupled along path A of FIG. 1, the valve 40 may be physically coupled to the compressor 24 or positioned directly adjacent the oil inlet of the compressor 24 where the oil supply flow path 64 injects oil into the compressor 24 so that the sensor portion 80A may be positioned directly in or adjacent to the compressor's oil inlet. In some constructions where the sensor portion 80A of the actuator 80 is fluidly coupled along path B of FIG. 1, the valve 40 may be physically coupled to the compressor 24 or positioned directly adjacent the outlet of the compressor 24 where the compressed air/oil mixture is ejected from the compressor 24 to the outlet flow path 44 so that the sensor portion 80A may be positioned directly in or adjacent to the compressor's outlet. In some constructions where the sensor portion 80A of the actuator 80 is fluidly coupled along path C of FIG. 1, the valve 40 may be physically coupled to or positioned directly adjacent the outlet of the oil separator 28 or the inlet of the filter 32 so that the sensor portion 80A may be positioned directly in or adjacent to the separator outlet or the filter inlet. In other arrangements, the sensor portion 80A is remotely located and fluid is directed along one of the paths A, B, or C to the sensor portion 80A to allow the sensor portion 80A to sense the fluid temperature. The operation of the valve 40 can be calibrated to control the temperature and the flow of oil based on the use of any one of the possible paths A, B, C.

In some constructions, the actuator 80 may be a diaphragm-type thermal actuator available from Caltherm Corporation of Columbus, Ind. The sensor portion 80A of the actuator 80 can include an expansion material 104 contained within a cup 108 and configured to move the prime mover portion 80B in a predetermined linear manner within the operating temperature range of the compressor 24 (i.e., the temperature range of the oil or air/oil mixture). In some constructions, the expansion material 104 is wax which changes phase from solid to liquid within the operating temperature range of the compressor 24. The prime mover portion 80B of the actuator 80 can include a piston 112 that is coupled to a diaphragm 116 with a plug 120. The diaphragm 116 cooperates with the cup 108 to define a chamber that contains the expansion material 104. A housing or piston guide 124 of the actuator 80 at least partially encloses the piston 112 and the plug 120, and cooperates with the cup 108 to sandwich the diaphragm 116 in position. The exterior of the piston guide 124 includes male threads 128 for engaging the actuator 80 with a threaded aperture 132 of the valve body 74.

Although the actuator 80 is illustrated to include a linearly traveling prime mover portion 80B which actuates the sleeve 76 in a linear manner, a rotary type actuator can be substituted. The valve 40 can be reconfigured to selectively establish and terminate fluid communication between the inlets 70A, 70B and the apertures 92A, 92B upon rotative movement of the sleeve 76 within the chamber 78 or a transmission device can be provided to convert rotative movement to linear movement.

In some constructions, the actuator 80 may be an electromechanical actuator. In such constructions, the sensor portion 80A of the actuator 80 can be an electrical sensor configured to output an electrical signal. The prime mover portion 80B can be an electrical motor that is configured to move the sleeve 76 back and forth in a calibrated manner between the positions described above, based on the fluid temperature sensed by the sensor portion 80A. The sensor portion 80A and the prime mover portion 80B can be located remotely from each other or adjacent each other.

In operation, the valve 40 operates to control the quantity and temperature of the oil delivered to the compressor 24 to assure that the minimum and most efficient quantity of oil is delivered to the compressor 24 unless the oil temperature demands additional flow. During compressor start-up, the compressor 24 and the oil are both cold. The oil does not perform optimally at this lower temperature and it is desirable to heat the oil to a desired temperature range as quickly as possible. The valve 40 senses this low oil temperature and maintains the sleeve in the position illustrated in FIG. 2. When in this position, none of the oil passes through the oil cooler 36. Rather, the oil continues to circulate through the compressor 24, thereby heating the oil. As the oil temperature enters the optimal temperature range, the sleeve 76 begins moving to the right toward the position illustrated in FIG. 3. Before reaching the position of FIG. 3, some of the oil entering the mixing chamber 96 is cooled enough to remove an amount of heat about equal to the heat added by the compressor 24 during operation, thereby maintaining the oil within the desired range. As the load increases on the compressor 24, the sleeve 76 eventually reaches the point illustrated in FIG. 3. At this point, all of the oil must be cooled to maintain the oil within the desired temperature range and of the desired flow rate. As load increases further, the oil temperature increases above the desired range. The actuator 80 senses this temperature and moves the sleeve 76 toward the position illustrated in FIG. 4. In this position, the valve 40 admits additional cooled oil to further cool the compressor 24. Thus, the flow rate of oil to the compressor 24 only increases above the minimum predetermined amount when the oil temperature dictates that additional flow is required.

FIGS. 5-8 illustrate a compressor system 110 that includes a flow and temperature control device 115 that includes an electromechanical or electrical actuator 120. As with the system of FIGS. 1-4, the system of FIGS. 5 and 6 includes an oil-flooded compressor 125 (e.g., an oil-flooded screw compressor) that operates to produce a flow of compressed air. Oil is injected or drawn into the compressor 125 to improve the seals within the compressor 125, to lubricate the moving parts of the compressor 125, and to remove some of the heat of compression generated during the compression process. The system 110 also includes an oil separator 130 and an oil cooler 135 that are similar to those described with regard to FIGS. 1-4 and will not be described in detail.

The flow and temperature control device 115 includes a flow divider 140, a thermal control valve 145, a controller 150, and various sensors 155. The flow divider 140 is positioned to receive a flow of hot oil 160 from the oil separator 130 and operates to divide that flow into a first flow 165 directed to the oil cooler 135 and a second flow 170 directed to the thermal control valve 145. The first flow 165 is cooled in the oil cooler 135 and discharged from the oil cooler 135 as a third flow 175. The thermal control valve 145 is positioned to receive the second flow 170 or hot coolant flow, and the third flow 175 or cooled coolant flow and to discharge a fourth flow 180 or bulk flow of coolant at a desired mixed temperature. The fourth flow of coolant 180 is injected into or drawn into the compressor 125 through an oil filter to complete the oil flow cycle.

Figure 5:
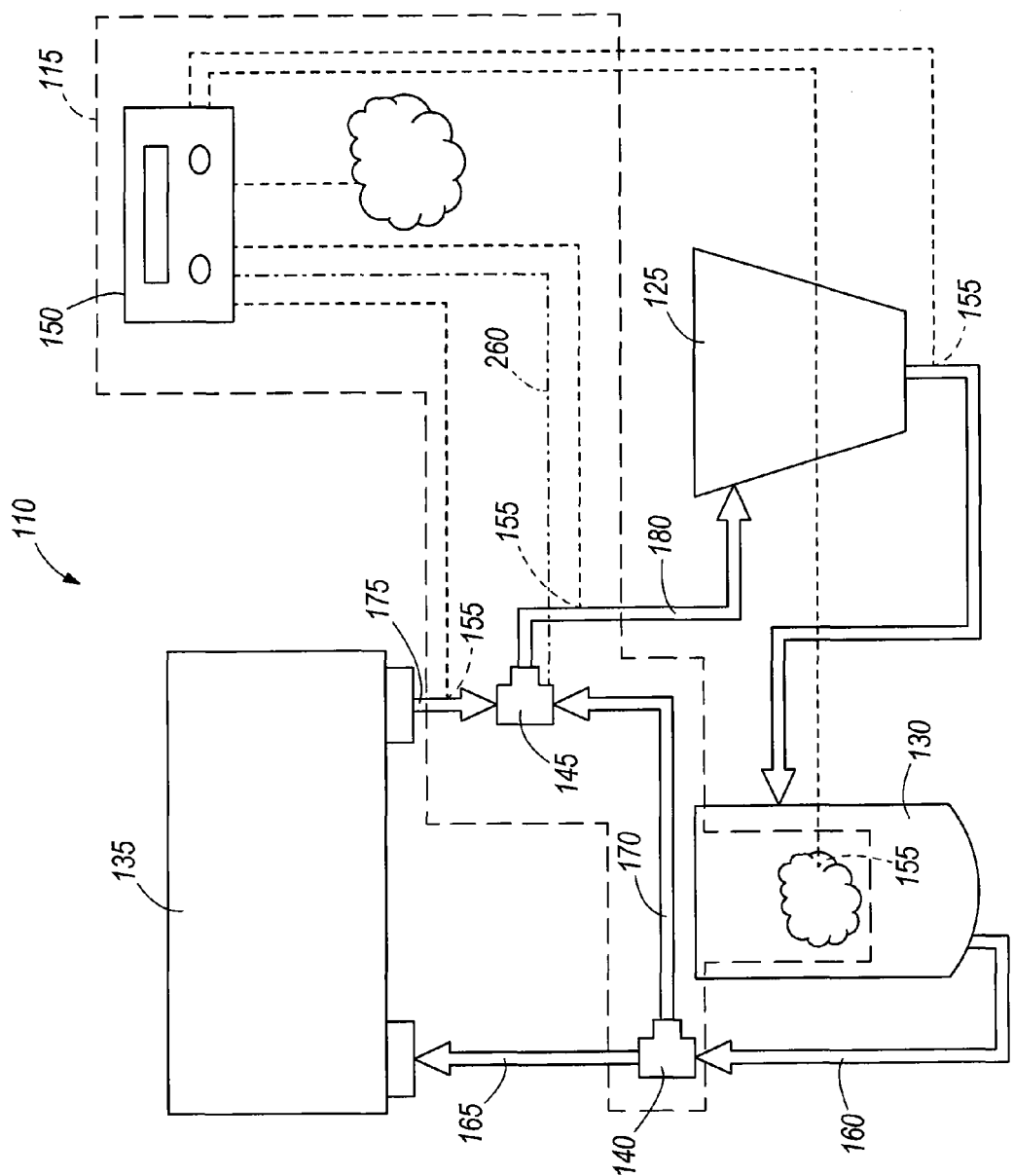
FIG. 5 is a schematic illustration of another compressor system including a flow and temperature control device.
Figure 6:
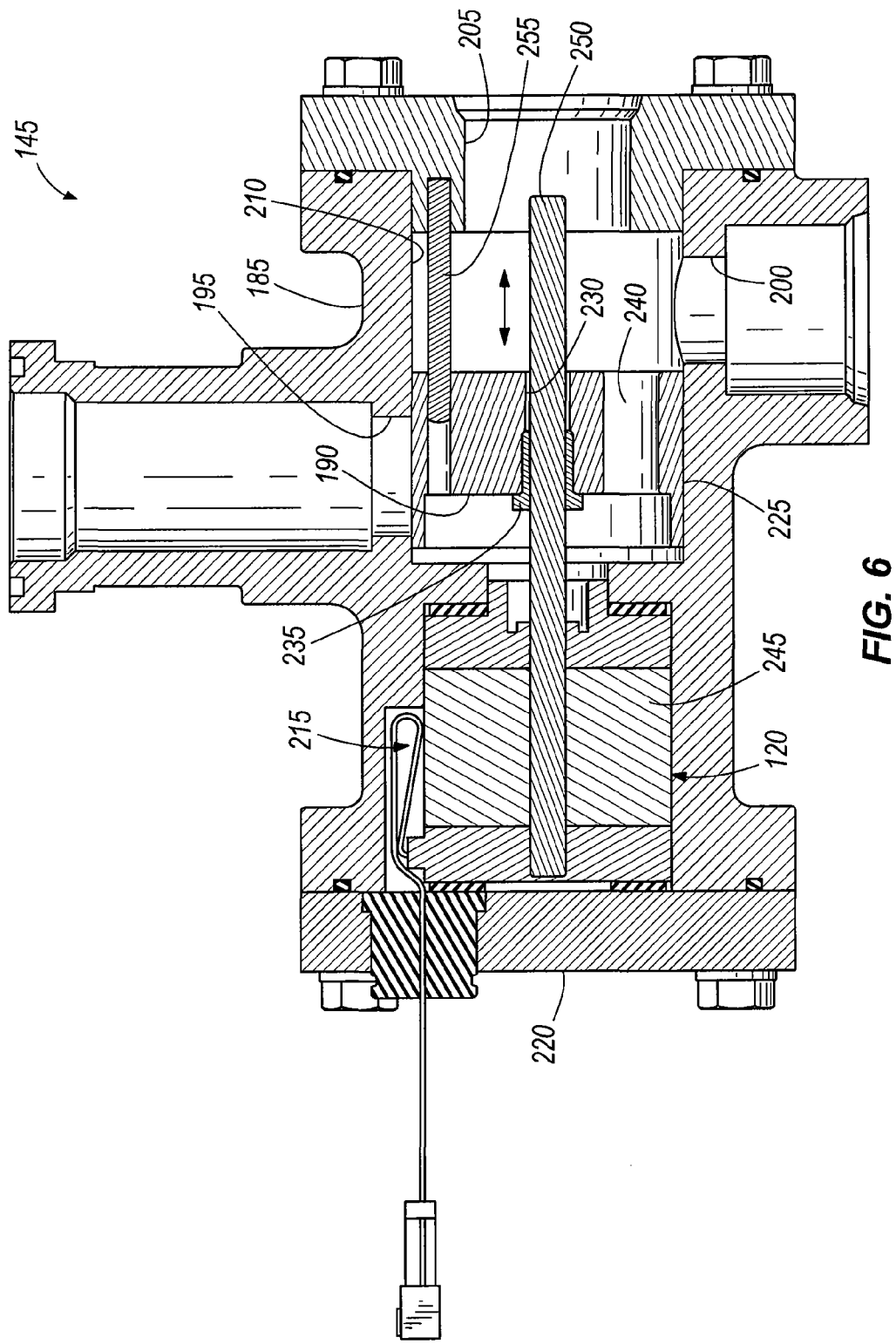
FIG. 6 is a section view of the flow and temperature control device of FIG. 5 in a first position.
Figure 7:
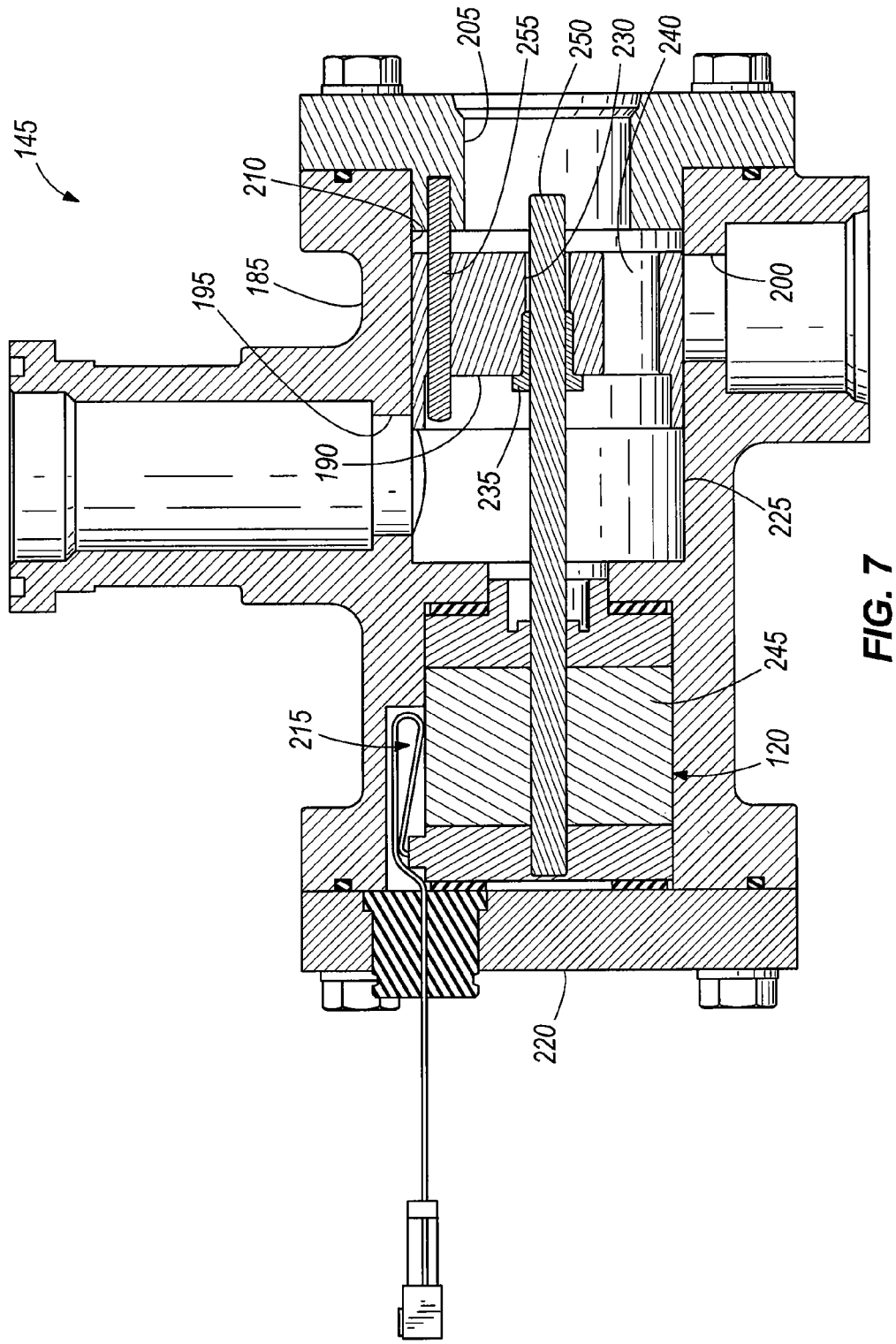
FIG. 7 is a section view of the flow and temperature control device of FIG. 5 in a second position.
Figure 8:
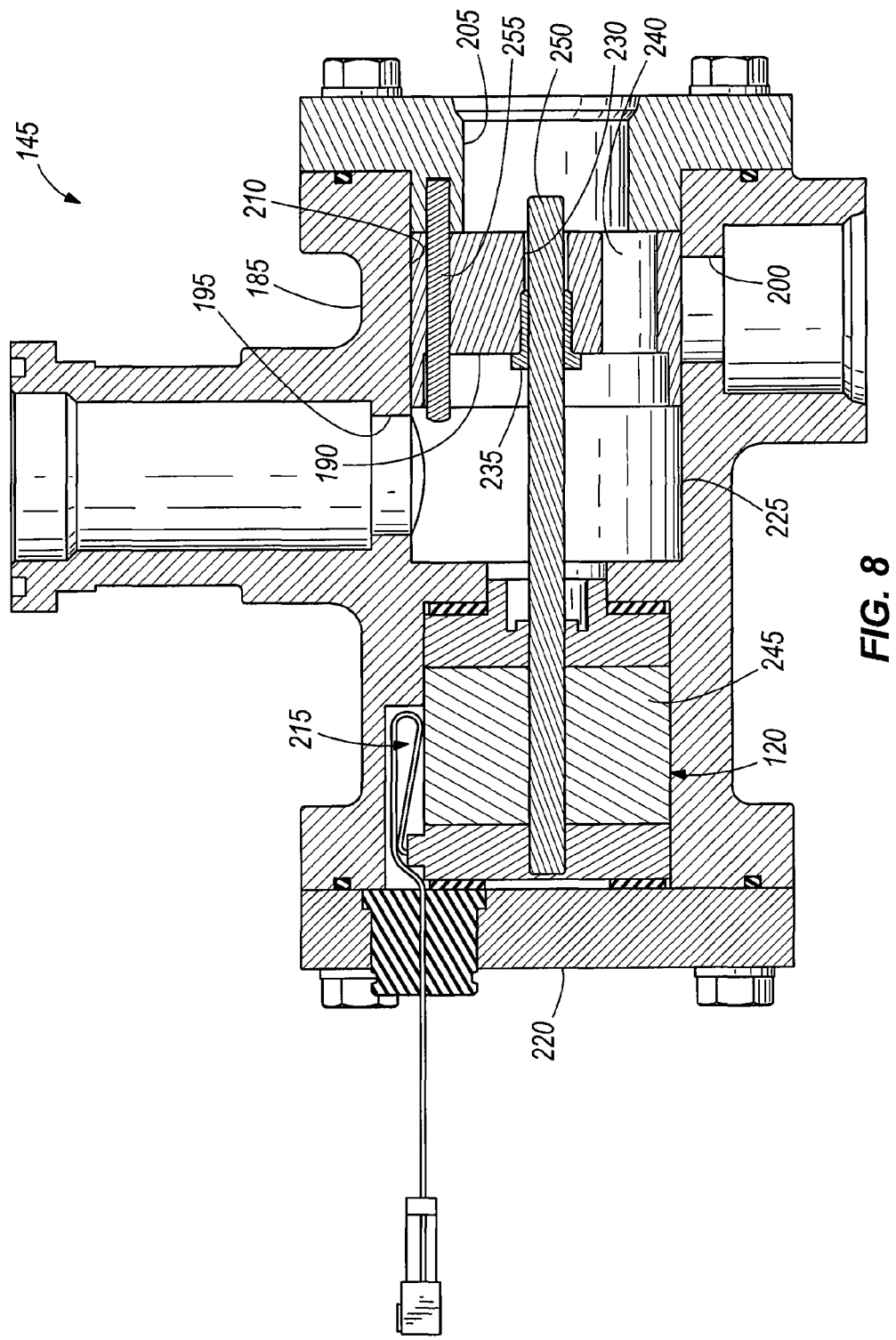
FIG. 8 is a section view of the flow and temperature control device of FIG. 5 in a third position.

With reference to FIG. 6, the thermal control valve 145 of FIG. 5 is illustrated as including a valve body 185, a sleeve 190, and the electromechanical or electrical actuator 120. The valve body 185 includes a cooled coolant inlet 195, a hot coolant inlet 200, and a mixed coolant outlet 205. In preferred constructions, the cooled coolant inlet 195 includes a larger flow area than the hot coolant inlet 200. The valve body 185 also defines a cylinder bore 210 sized to receive the sleeve 190 and an actuator space 215 sized to receive a portion of the electro/mechanical actuator 120. A cover 220 attaches to the valve body 185 to seal at least a portion of the electromechanical actuator 120 within the valve 185 and to inhibit oil leakage from the valve body 185.

The sleeve 190 includes an outer cylindrical surface 225 sized to closely fit within the cylinder bore 210. The sleeve 190 is movable axially (as indicated by the arrow in FIG. 6) along the cylinder bore 210 and provides a seal there between. The sleeve 190 includes a central aperture 230 that receives a threaded nut 235 and at least one flow passage 240 that allows for the flow of oil through the sleeve 190.

The electromechanical actuator 120 includes a motor 245 that is positioned within the actuator space 215 and that is operable to rotate a lead screw 250 connected to the motor 245. In preferred constructions, a stepper motor 245 is used to allow for the precise positioning of the lead screw 250. However, other constructions could employ a standard DC motor or other type of motor as required.

The lead screw 250 threadably engages the nut 235 such that rotation of the lead screw 250 produces axial movement of the sleeve 190. In some constructions, a clutch mechanism (not shown) is positioned between the motor 245 and the lead screw 250 to reduce the likelihood of damage should movement of the sleeve 190 be inhibited. A pin 255 is fixedly positioned with respect to the valve body 185 and engages the sleeve 190 to inhibit rotation of the sleeve 190 while still allowing free axial movement of the sleeve 190 in response to rotation of the lead screw 250.

In operation, a signal 260 is provided to the motor 245 that results in operation of the motor 245. With the valve 145 in the first position illustrated in FIG. 6, only hot oil entering the valve body 185 via the hot coolant inlet 200 flows out of the valve 145 via the mixed coolant outlet 205. This position represents one end of travel for the sleeve 190. As the motor 245 operates and rotates the lead screw 250, the sleeve 190 begins to move toward a second position (shown in FIG. 7). As the sleeve 190 moves to the right of the position in FIG. 6, the cooled coolant inlet 195 begins to uncover. Cooled oil is now able to flow into the space to the left of the sleeve 190 and through the sleeve 190 to the mixed coolant outlet 205. It should be noted that as the cooled coolant inlet 195 begins to uncover, the hot coolant inlet 200 begins to cover. In preferred constructions, the area of the cooled coolant inlet 195 that is exposed or opened is equal to the area of the hot coolant inlet 200 that is covered or closed. With continued movement to the right, the sleeve 190 will eventually occupy the second position in which the hot coolant inlet 200 is completely covered, thereby blocking any flow of hot coolant, and the cooled coolant inlet 195 is partially open. With the sleeve 190 in any position between the first position and the second position, a substantially equal amount of oil flows from the valve body 185 via the mixed coolant outlet 205. When in the first position, 100 percent of that oil is hot oil, when in the second position 100 percent of that oil is cooled oil, and when in a positioned between the first position and the second position, the flow is a mixture of hot coolant and cooled coolant. As the sleeve 190 moves further to the right, from the second position toward a third position (shown in FIG. 8), additional cooled coolant is able to flow through the valve 145. Eventually, the sleeve 190 reaches the third position (shown in FIG. 8) from which additional travel to the right is inhibited. In this position, a greater quantity of coolant flows to the compressor 125 than when the sleeve 190 is in the second position. Thus, the valve 145 is operable to deliver a first quantity of coolant to the compressor when the sleeve 190 is positioned between the first position and the second position. The first quantity of coolant is substantially the same no matter the position of the sleeve 190 between the first position and the second position. However, the temperature of the coolant is varied. When the sleeve 190 is in the third position, a second quantity of coolant is delivered to the compressor 125. The second quantity is greater than the first quantity. As the sleeve 190 moves from the second position toward the third position, the available cooled coolant flow area continues to increase. Thus, the quantity of coolant delivered to the compressor 125 varies between the first quantity and the second quantity as the sleeve 190 moves from the second position to the third position.

With reference to FIG. 5, the controller 150 employs a number of inputs or sensors 155 that can be monitored and used to determine what control signal 260 to provide to the motor 245. In some constructions, the motor 245 can receive detailed positional signals that drive the motor 245 and lead screw 250 to a particular position, while other constructions employ a feedback loop to move the sleeve 190 in a desired direction between the first position and the third position. In the illustrated construction, the controller 150 includes sensors 155 that monitor, among other parameters, compressor discharge temperature, oil inlet temperature, discharge air temperature, oil cooler discharge temperature, ambient air temperature and ambient air relative humidity. Any or all of these parameters can be used by the controller 150 to generate the control signal 260 that is then transmitted to the motor 245. The signal 260 can move the motor 245 to position the sleeve 190 in a desired position or can simply move the sleeve 190 a desired distance in a desired direction. In this arrangement precise control of the position of the sleeve 190 and the temperature of the coolant leaving the valve 145 is possible.

The arrangement of FIGS. 5 and 6 can measure ambient air conditions such as temperature, pressure, and/or relative humidity. The arrangement can also measure system pressure (e.g., at the oil separator, or compressor discharge pressure) and can use this data to calculate the minimum required temperature of the compressed mixture (i.e., the target airend/compressor discharge temperature) within the compressor 125 to inhibit the formation of condensation. This value is calculated at specific time intervals and is compared with the actual airend/compressor discharge temperature with any variation between the two being used to generate a signal to move the valve 145 in a required direction in an effort to nullify the difference. The valve 145 can than be adjusted to maintain the optimum required airend/compressor discharge temperature to assure that condensation does not form within the compressor 125. Other designs must operate at a higher temperature that corresponds to the worst case conditions (e.g., highest ambient air temperature, highest relative humidity, and the highest system discharge pressure) to assure that condensation does not form in the compressor 125. The operation at a temperature higher than required can reduce the life of the coolant and the compressor 125. This is particularly important with variable speed compressors 125, such as those disclosed herein because the operating conditions can vary greatly when compared to the worst case scenario.

In one particular construction, the controller 150 controls the control valve 145 by first determining a target airend discharge temperature. The target airend discharge temperature is the minimum temperature at which condensation will not form in the compressor 125. It is most efficient and cost effective to operate the compressor 125 using oil (coolant, lubricant, etc.) at a temperature as close to the target airend temperature as possible without going below the target airend temperature. This target temperature can be determined by using the inlet temperature and sump pressure. In one application, the target pressure set point is used instead of sump pressure because sump pressure is always changing, thereby making the target temperature less stable. To compensate for this, some constructions add a few degrees (e.g., 10 F) to the target airend discharge temperature.

If a relative humidity sensor is employed, the relative humidity of the ambient air can be factored into the equation to calculate the target airend temperature. In constructions that do not employ a relative humidity sensor, a constant relative humidity (e.g., 90 percent) can be assumed. Once the target airend temperature is calculated, the controller 150 operates to position the control valve 145 to maintain the airend discharge temperature at the target airend temperature.

There are multiple control methods for controlling the valve 145. In one construction, a PID control system is employed. The PID loop calculates the error between actual airend discharge temperature and target airend discharge temperature and uses that error with the rate of change to determine the number of steps and direction to move the control valve 145. In another construction, the controller 150 can make several comparisons between the airend discharge temperature and the target airend discharge temperature to determine how much to move the control valve 145. This would be similar to a fuzzy logic control. The controller 150 would also look at the rate of change to calculate where the airend discharge temperature will be in the future (e.g., 5 seconds later). If the actual discharge temperature is within a desired range (e.g., plus/minus 1 deg) of the target temperature and the estimated airend discharge temperature in the future is within a second desired range (e.g., plus/minus 1 deg of the target temperature), the controller 150 can maintain the current valve position.

However, if the system is outside of these desired ranges, the controller 150 will make a series of comparisons to determine how much to move the valve 145 and in what direction to move the valve 145.

First, the controller 150 calculates a target injected coolant temperature (target airend discharge temp−(airend discharge temp−inlet coolant temp)). Next, the controller 150 checks for the need to make an extreme movement in the control valve 145. An extreme movement would be a move to the full third position (maximum flow of oil from the oil cooler to the airend) or a move to the first position (no flow of oil from the cooler, hot oil being bypassed directly to the airend). If the target injected coolant temperature is less than the temperature of the oil in the cooler, the control valve 145 will move to the third position. If the target injected coolant temperature is greater than the airend discharge temperature, the control valve 145 will move to the first position. If neither of the extreme movements is required, the controller 150 will calculate a normal movement of the valve 145. The controller 150 will calculate a percentage of travel (e.g., 100 percent would move the valve 145 from the first position to the third position or vice/versa).

The percentage can be calculated using the following formula:

$$(\text{airend discharge temperature in future} - \text{target airend discharge temperature}) / (\text{airend discharge temperature} - \text{cooler output temperature}).$$

If this value is positive, the valve 145 will move toward the third position. If it is negative, the valve 145 will move toward the first position. In a preferred construction, 1 percent=71 steps in the stepper motor 245. Thus, the calculated percentage is multiplied by 71 and the motor 245 moves that many steps in the desired direction. These movements are calculated periodically (e.g., every 5 seconds).

It should be noted that the valves described and illustrated herein utilized linear or axial movement to move between the first position, the second position, and the third position. However, rotary valves or other valve arrangements could also be employed if desired. For example, one construction employs a rotary valve that rotates a valve element to expose and cover two inlet ports. In this construction, the stepper motor can directly drive the valve element or a gear train or other transmission arrangement can be employed. Thus, the invention should not be limited to the valve arrangements illustrated herein.

Thus, the invention provides, among other things, a compressor system 20 including a control valve 40 operable to mechanically control the temperature and the flow of oil to a compressor 24. A sleeve 76 of the valve 40 is provided with multiple apertures to provide cooled, non-cooled, or mixed oil in variable predetermined flow amounts to the compressor 24 based on a sensed condition of the compressor 24. Various features and advantages of the invention are set forth in the following claims.

What is claimed is:

1. A thermal control valve for use in a lubricant flooded compressor system including a controller that generates a control signal, the thermal control valve comprising:
    a valve body including a hot coolant inlet, a cooled coolant inlet, a mixed coolant outlet, an actuator space, and a cylinder bore;
    a sleeve positioned within the cylinder bore and movable between a first position, a second position, and a third position; and
    an electrical actuator at least partially disposed within the actuator space and operable in response to the control signal to slidably move the sleeve between the first position, the second position, and the third position;
    wherein the hot coolant inlet defines a first flow area and the cooled coolant inlet defines a second flow area that is larger than the first flow area; and
    wherein the sleeve in the first position completely covers the cooled coolant inlet and completely uncovers the hot coolant inlet, and wherein the sleeve in the second position partially uncovers the cooled coolant inlet and completely covers the hot coolant inlet, and wherein the sleeve in the third position completely uncovers the cooled coolant inlet and completely covers the hot coolant inlet.

2. The thermal control valve of claim 1, wherein the electrical actuator includes a stepper motor.

3. The thermal control valve of claim 2, further comprising a lead screw rotatably coupled to the stepper motor and threadably engaged with the sleeve to move the sleeve between the first position, the second position, and the third position in response to rotation of the stepper motor.

4. The thermal control valve of claim 1, wherein a flow of hot coolant is delivered to the valve at the hot coolant inlet, a flow of cooled coolant is delivered to the valve at the cooled coolant inlet and the valve discharges a first quantity of bulk coolant via the mixed coolant outlet when the sleeve is between the first position and the second position and discharges a second quantity of bulk coolant greater than the first quantity of bulk coolant when the sleeve is in the third position.

5. The thermal control valve of claim 4, wherein the quantity of bulk coolant varies between the first quantity and the second quantity as the sleeve is positioned between the second position and the third position.

6. A compressor system comprising:
    a compressor including a gas inlet and a lubricant inlet, the compressor operable to compress a gas and discharge a mixed flow of compressed gas and lubricant;
    a valve housing including a hot lubricant inlet, a cooled lubricant inlet, and a lubricant outlet connected to the lubricant inlet of the compressor;
    a sleeve disposed within the valve housing and movable between a first position and a second position, the sleeve selectively uncovering the hot lubricant inlet to selectively direct a hot lubricant to the lubricant outlet and selectively uncovering the cooled lubricant inlet to selectively direct a cooled lubricant to the lubricant outlet, the hot lubricant and cooled lubricant mixing at the lubricant outlet to define a bulk lubricant that is directed to the lubricant inlet of the compressor;
    a controller operable to sense a parameter and generate a control signal at least partially in response to the sensed parameter;
    a motor coupled to the sleeve and operable to move the sleeve in response to the control signal, the movement of the sleeve being operable to vary the amount of hot lubricant admitted through a first aperture and to vary the amount of cooled lubricant admitted through a second aperture to control a temperature of the bulk lubricant; and
    wherein the sleeve is slidably movable between the first position in which the hot lubricant inlet is fully open and the cooled lubricant inlet is fully closed such that all of the lubricant flowing to the lubricant outlet amounts to a first quantity, and the second position in which the hot lubricant inlet is closed and the cooled lubricant inlet is partially open such that all of the lubricant amounts to a second quantity that is about equal to the first quantity; wherein the first aperture has a first size and the second aperture has a second size that is larger than the first size.

7. The compressor system of claim 6, further comprising a lubricant separator and a lubricant cooler, the lubricant separator operable to separate the mixed flow of compressed gas and lubricant into a flow of compressed gas and a flow of lubricant, at least a portion of the flow of lubricant passing through the lubricant cooler to reduce the temperature of the portion of the flow of lubricant.

8. The compressor system of claim 7, wherein the lubricant cooler includes an outlet in fluid communication with the cooled lubricant inlet such that the portion of the flow of lubricant flows through the lubricant cooler to the cooled lubricant inlet and the remainder of the flow of lubricant bypasses the lubricant cooler and flows to the hot lubricant inlet.

9. The compressor system of claim 6, wherein the sleeve is further movable between the second position and a third position in which the hot lubricant inlet is closed and the cooled lubricant inlet is fully open such that all of the lubricant flowing to the lubricant outlet flows through the cooled lubricant inlet and amounts to a third quantity that is greater than the first quantity.

10. The compressor system of claim 6, wherein the motor includes a stepper motor operable to drive a lead screw to move the sleeve.

11. The compressor system of claim 6, wherein the parameter is a discharge temperature of the mixed flow of compressed gas and lubricant discharged from the compressor.

12. A valve system comprising:
    a valve housing including a hot lubricant inlet, a cooled lubricant inlet and a lubricant outlet connectable to a lubricant inlet of a compressor;
    a sleeve disposed within the valve housing and movable between a first position and a second position, the sleeve defined by a substantially solid body extending along a longitudinal length and bounded by first and second end walls, the sleeve selectively uncovering the hot lubricant inlet to selectively direct a hot lubricant to the lubricant outlet and selectively uncovering the cooled lubricant inlet to selectively direct a cooled lubricant to the lubricant outlet, the hot lubricant and cooled lubricant mixing at the lubricant outlet to define a bulk lubricant discharged from the lubricant outlet;

a pin aperture extending through each of the endwalls along the longitudinal length of the sleeve;

a lead screw aperture extending through the longitudinal length of the sleeve;

a flow passage aperture extending through each of the endwalls along the the longitudinal length of the sleeve;

an actuator coupled to the sleeve being operable to move the sleeve to vary the amount of hot lubricant admitted through a first aperture and to vary the amount of cooled lubricant admitted through a second aperture to control a temperature of the bulk lubricant.

13. The compressor system of claim 12, further comprising a pin slidably engageable within the pin aperture at one end and connected to the valve housing at the other end.

14. The compressor system of claim 12, further comprising a lead screw engageable within the lead screw aperture at one end and connected to the actuator at the other end.

15. The compressor system of claim 12, wherein the actuator is an electric actuator.

16. The compressor system of claim 12, wherein the flow passage aperture forms a fluid conduit between a hot lubricant passageway proximate one end of the sleeve and a cooled lubricant passageway proximate the other end of the sleeve.

17. A method of controlling the temperature and quantity of a bulk flow of coolant to a lubricant flooded compressor in a compressor system, the method comprising:

dividing a flow of hot coolant into a first flow of coolant and a second flow of coolant;

cooling the first flow of coolant to produce a third flow of coolant;

directing the second flow of coolant and the third flow of coolant to a valve and discharging the bulk flow of coolant from the valve;

sensing a parameter of the compressor system and delivering the measured parameter to a controller;

generating a control signal at least partially in response to the sensed parameter; and operating an electrical actuator at least partially in response to the control signal to configure the valve between a first position, a second position, and a third position, wherein the bulk flow of coolant includes only coolant from the second flow of coolant when the valve is in the first position, the bulk flow of coolant includes only coolant from the third flow of coolant when the valve is in the second position, and the bulk flow of coolant includes a mixture of coolant from the second flow of coolant and the third flow of coolant when the valve is between the first position and the second position; and delivering a first quantity of coolant in the bulk flow of coolant when the valve is positioned between the first position and the second position and delivering a second quantity of coolant in the bulk flow of coolant when the valve is positioned in the third position, the second quantity being greater than the first quantity.

18. The method of claim 17, wherein the electrical actuator includes a stepper motor, and wherein the method further includes rotating the stepper motor in response to the control signal to rotate a lead screw and move a sleeve axially between the first position, the second position, and the third position.

19. The method of claim 17, wherein a quantity of coolant in the bulk flow of coolant continuously varies between the first quantity when the valve is between the first position and the second position and the second quantity when the valve is in the third position.

20. The method of claim 17, wherein the parameter is a discharge temperature of the compressor.

* * * * *